United States Patent
Blaschke

(10) Patent No.: US 10,648,946 B2
(45) Date of Patent: May 12, 2020

(54) ION MOBILITY SPECTROMETER

(71) Applicant: Bruker Daltonik GmbH, Bremen (DE)

(72) Inventor: Michael Blaschke, Metzingen (DE)

( * ) Notice: Subject to any disclaimer, the term of this patent is extended or adjusted under 35 U.S.C. 154(b) by 0 days.

(21) Appl. No.: 15/895,247

(22) Filed: Feb. 13, 2018

(65) Prior Publication Data

US 2018/0259485 A1 Sep. 13, 2018

(30) Foreign Application Priority Data

Mar. 8, 2017 (DE) .................. 10 2017 104 794

(51) Int. Cl.
*G01N 27/62* (2006.01)
*H01J 49/40* (2006.01)
*H01J 49/00* (2006.01)

(52) U.S. Cl.
CPC ........ *G01N 27/622* (2013.01); *H01J 49/0027* (2013.01); *H01J 49/40* (2013.01)

(58) Field of Classification Search
CPC ............. G01N 27/622; H01J 49/0027; H01J 49/0031; H01J 49/02; H01J 49/24; H01J 49/26; H01J 49/40
See application file for complete search history.

(56) References Cited

U.S. PATENT DOCUMENTS

| | | | |
|---|---|---|---|
| 5,235,182 A | 8/1993 | Avida et al. | |
| 9,324,550 B1 * | 4/2016 | Jones | .......... G01N 27/622 |
| 2005/0109930 A1 * | 5/2005 | Hill, Jr. | ............ G01N 27/622 250/286 |
| 2008/0073514 A1 * | 3/2008 | Landgraf | ............ G01N 27/622 250/290 |
| 2014/0117222 A1 * | 5/2014 | Nguyen | ................. H01J 49/00 250/282 |
| 2014/0264021 A1 * | 9/2014 | Atamanchuk | ........ G01N 27/622 250/336.1 |

FOREIGN PATENT DOCUMENTS

| | | | |
|---|---|---|---|
| CN | 103367092 A | 10/2013 | |
| DE | 10347656 A1 * | 5/2005 | .......... G01N 27/622 |
| DE | 102006006683 A1 | 8/2007 | |
| DE | 102016101598 A1 | 8/2017 | |
| WO | 2005050159 A2 | 6/2005 | |
| WO | 2014153347 A1 | 9/2014 | |

OTHER PUBLICATIONS

Polytron Plastics Technik GMBH & Co. KG, Werkstoffbroschure-Hochleistungkunstoffe, 2011 (Year: 2011).*
Polytron Plastics Technik GMBH & Co. KG< Werkstoffbroschure-Hochistungkunstoffe, 2011 (Year: 2011).*
Polytron Plastics Technik GMBH & Co. KG, Werkstoffbroschüre-Hochleistungskunststoffe, 2011.
Soppart, O. et al., "Comparison of electric fields within drift tubes for ion mobility spectrometry", Meas. Sci. Technol. 11; pp. 1473-1479, 2000.

* cited by examiner

*Primary Examiner* — David E Smith
(74) *Attorney, Agent, or Firm* — Benoit & Côté Inc.

(57) ABSTRACT

The invention relates to the material, design and manufacture of a drift tube with an ion source region, particularly a miniaturized drift tube, for an ion mobility spectrometer to measure mobility spectra, particularly at atmospheric pressure. The invention proposes to use a high-performance plastic which can be injection-molded for the insulating main body for the drift tube and the ion source region. Polyphenylene sulfide (PPS) can be used for this purpose, for example.

15 Claims, 2 Drawing Sheets

ION MOBILITY SPECTROMETER

BACKGROUND OF THE INVENTION

Field of the Invention

The invention relates to an ion mobility spectrometer with a drift tube and its manufacture and operation, in particular the drift tube of a miniaturized ion mobility spectrometer operated at atmospheric pressure.

Description of the Related Art

A conventional ion mobility spectrometer operated at atmospheric pressure for the detection of explosives, chemical warfare agents, pollutants or drugs is depicted in FIG. 1. The ion mobility spectrometer comprises essentially a tube which is constructed from a series of ceramic rings (6a) and metal electrodes (6). The ceramic rings (6a) and metal electrodes (6) are firmly joined to each other, by means of hard-soldering, for instance. An ion source region (4) and a drift region (7) are located inside the tube, forming the interior of the drift tube. A gating grid (5) is positioned between the ion source region (4) and the drift region (7). Electrical DC potentials on the metal electrodes (6) generate an axial electric field, which drives ions through the drift gas located inside the tube. The ion mobility spectrometer is operated at temperatures of up to 200° Celsius and higher to prevent the deposition of pollutants on the interior walls.

The sampling can be done by guiding ambient air, which possibly contains pollutants, in the form of an air stream (1) past a heated membrane (2). The pollutants dissolve in the membrane (2), pass through it and vaporize into the ion source region (4). Molecules of the pollutants are ionized by the radiation of a radioactive substance (3), such as $^{63}$Ni, for example, and driven onto the gating grid (5) by the axial electric field in the ion source region (4). The gating grid (5) allows the ions to enter the drift region (7) of the drift tube for a short period of time. The ions usually need between 100 and 300 microseconds to pass through, and the acquisition of the spectrum takes around 30 milliseconds. Bipolar wire grids according to Bradbury-Nielsen are often used as gating grids (5). These can be operated with DC or RF voltages. To detect drugs or explosives, a swab sample can be taken from an object under investigation and heated in a desorption unit (not shown in FIG. 1). An air stream (1) fed through the desorption unit transfers the desorbed substances to the membrane (2) or directly into the ion source region (4).

The ions admitted through the gating grid (5) are then driven by the axial electric field through the drift gas (usually filtered air) in the drift region (7) until they reach a Faraday detector (9), their speed being determined by their "mobility". The mobility of the ions depends in a known way on their collision cross-section, their mass, their polarizability and their tendency to form complex ions with molecules of the drift gas. The axial electric driving field is formed by the series of electrodes (6) which surround the ion source region (4) and the drift region (7), and to which continuously increasing potentials are applied. A screen grid (8) prevents an image current of the incident ions from forming and thus sharpens the ion signal.

In the interior (7) of the drift tube, a flow of drift gas from the detector (9) to the gating grid (5) is maintained by the pump (24) and the gas lines (22), (25), (26) and (28). The drift gas comprising pollutants is removed by suction from the ion source region (4) and cleansed in the filter (23). At site (27), a doping substance to enhance the sensitivity for certain groups of substances can be added to the drift gas that is fed into the ion source region (4).

When a substance enters through the membrane (2) into the ion source region (4) together with the ambient air (1) or with the air stream (1) from a desorption unit, several ionic species are produced from molecules of this substance, such as monomers, dimers and complexes containing water and collision gas molecules, by means of radioactive radiation from the electron emitter (3), usually in complex sequences of reactions. Each ionic species has its own characteristic mobility. At the end of the drift region (7), the incident ion current is measured with the ion detector (9), digitized and stored as a "mobility spectrum" in the form of a digitized sequence of measured values. An evaluation of this mobility spectrum provides information on the mobilities of the ions involved and hence an indication as to the substances involved. Many pollutants can thus be unequivocally identified. The type of primary ionization (here by $^{63}$Ni) is of no consequence in practice. There are also ion sources which operate without radioactivity.

The method is extraordinarily sensitive in respect of certain groups of substances and is used on a large scale for the measurement of pollutants in air, for example for monitoring of chemical laboratories, continuous monitoring of filters, control of drying processes, monitoring of waste air, and detection of chemical warfare agents, explosives and drugs, for example at airports.

For a common spectral acquisition rate of about 30 spectra per second, and an ion transmission time of between 150 and 300 microseconds, only between half and one percent of the ions of a substance introduced in a gaseous state are actually utilized. The remaining ions are discharged, predominantly in the gating grid (5), and are lost to the measurement process.

The patent DE 102008015000 B4 (U. Renner; GB 2458368 B; U.S. Pat. No. 8,304,717 B2) describes a method in which the ion current in the ion mobility spectrometer is modulated at the gating element (5) with a continuous modulation function, and the mobility spectrum is generated from the measured ion current by means of a correlation analysis with the modulation pattern. A gating element (5) which provides a characteristic that is as linear as possible is advantageous for the modulation, since otherwise interfering sidebands occur, which can wrongly be assumed to be real signals. A favorable modulation function is a "chirp", i.e., a sine function whose frequency is continuously varied from a lower limit to an upper limit and which is continually repeated in continuous measurement mode. By means of the modulation method, almost 50 percent of all ions formed are utilized for the measurement, and for this reason this method is far more sensitive than the switching of short ion pulses.

In FIG. 1, the ion source (4) and the drift tube (7) are constructed from ceramic rings (6a) and metal electrodes (6) which are firmly joined together, for instance by means of hard-soldering. The materials used for this are characterized by low outgassing, but are complex and expensive to produce. Many attempts have therefore been made to simplify the manufacture of drift tubes.

U.S. Pat. No. 7,155,812 B1 (K. A. Petersen et al., 2007) describes that a drift tube made of green (unfired) ceramic or flexible plastic with electrodes applied thereon is rolled to form a tube, before the structure is strengthened by firing or bonding.

U.S. Pat. No. 9,324,550 B1 (D. A. Jones, 2015) describes that a drift tube is produced from flexible plastic sheets with patterned metal coatings and in a multi-layered way resulting in a printed shielding.

The utility model DE 20 2013 105 685 U1 (B & S Analytik GmbH, 2013) describes a drift tube whose interior surfaces are made of a perfluoroalkoxy polymer (PFA) to prevent the deposition of substances. These surfaces can even cover the electrodes.

The patent application WO 2014/153347 A1 (A. Drumheller, 2014) depicts a drift tube made of any insulating material, bonded on the inside with a foil which forms a resistance pattern, for example a resistance pattern in the form of a helix.

The published patent application DE 10 2006 006 683 A1 (J. Landgraf et al., 2006) describes a drift tube which comprises ceramic or plastic disks. The drift tube comprises apertures for longitudinal channels used to guide the gas in addition to apertures for the drift region.

There is still a need for an ion mobility spectrometer which can be produced at low cost and has a high analytical efficiency, particularly when it is used at operating temperatures above 150° Celsius.

SUMMARY OF THE INVENTION

The invention provides an ion mobility spectrometer with a drift tube and an upstream ion source region, wherein the drift tube or the ion source region or both have a main body which is made, at least in part, of a high-performance plastic. The main body of the ion source region can be connected to the main body of the drift tube, or it can form a shared main body with the main body of the drift tube.

High-performance plastics are a subgroup of the thermoplastics, and they differ from engineering plastics and standard plastics in respect of their temperature resistance, in particular, but also in terms of their resistance to chemicals and their mechanical properties. The high-performance plastics comprise aromatic structures. A high-performance plastic made from purely aromatic units, such as poly(p-phenylene), has an extremely high softening point of around 500° C. and can still be used at high temperatures. The high softening point also makes it more difficult to process, however. In order to achieve a compromise between processability and stability, functional groups arranged between the aromatic structures are used for commercially available high-performance plastics.

The high-performance plastic used for the main body of the drift tube and/or the ion source region is preferably a polyaryl, where the aromatic structures (rings) are linked via oxygen or sulfur atoms or CO or $SO_2$ groups, particularly a polyphenylene sulfide (PPS). The used high-performance plastic is preferably formable by injection molding.

The main body of the drift tube and/or the ion source region can comprise two joined half-shells with grooves on the inside, wherein the main body comprises conductive electrodes, in particular metal rings, which are inserted into the internal grooves. The ion mobility spectrometer can comprise a DC voltage source which, for example, supplies the conductive electrodes with electrical DC potentials in such a way that a constant drift field is generated in the drift tube and the ion source. Instead of conductive electrodes, a gating element or a screen grid can be inserted into one of the internal grooves in each case.

The main body of the drift tube and/or the ion source region can also comprise two joined half-shells whose interior surfaces have no grooves, but are coated with a pattern of conductive layers, especially metal layers. The inside conductive layers serve as electrodes to generate the electric drift field and can be supplied with electrical DC potentials from the outside via conductive connections.

In both embodiments, the half-shells can be furnished with tongues and grooves, which are dimensioned so that the two half-shells are joined to each other by means of a press-fit connection. Other types of joining can also be used for the half-shells, however.

The main body of the drift tube and/or the ion source region or a segment thereof can also comprise a single plastic body which is injection molded around inner conductive electrodes as a full-mold unit. The electrodes can have connection pins which protrude from the main body so as to be appropriately contactable from outside.

The wall of the main body can comprise longitudinal channels to guide the gas and/or to accommodate heating elements. The longitudinal channels can feed drift gas into the drift tube and into the ion source or draw it off, and the channels can be connected to ring channels which are themselves connected to the interior of the drift tube, through holes drilled in the walls, for example. The holes can be sealed on the outside by means of plugs.

The ion mobility spectrometer and particularly the main body of the drift tube and ion source are preferably miniaturized to such an extent that they have a length of between 4 and 12 centimeters, in particular around 6 centimeters. The inner diameter of the drift tube is preferably 6 to 12 millimeters.

The ion mobility spectrometer can have a desorber chamber upstream of the ion source region with a main body which also comprises, at least partially, a high-performance plastic and which is connected to the main body of the ion source region or which forms a shared main body with the main body of the ion source region.

The invention provides a method for the manufacture of a main body of an ion mobility spectrometer, wherein the main body of a drift tube and/or the main body of an ion source region is formed by injection molding of a high-performance plastic.

The high-performance plastic used for the injection molding here is preferably a polyaryl, where the aromatic rings are linked via oxygen or sulfur atoms or CO or $SO_2$ groups, in particular a polyphenylene sulfide (PPS).

The method of manufacture particularly comprises that the main body is injection molded around inner conductive electrodes to form a full-mold unit. To this end, metal rings can be applied to a mold core which, together with the metal rings, is surrounded by the injection molding material inside an outer mold block. After removing the outer mold block and the inner mold core, the main body with integrated electrodes is complete. The electrodes can have connection pins which protrude from the main body and can be contacted accordingly. The injection molding tool can be shaped so that channels are formed in the wall of the main body.

The invention additionally provides a method to operate an ion mobility spectrometer, wherein the ion mobility spectrometer comprises a drift tube and an ion source region which are manufactured from a high-performance plastic, especially from polyphenylene sulfide (PPS), and the drift tube or the ion source region, or both, can be operated at a temperature of between 100° Celsius and 220° Celsius. The ion mobility spectrometer can be operated at atmospheric pressure, for which the drift tube and the ion source region should be airtight, but do not have to be vacuum-tight.

By using a high-performance plastic according to the invention, an ion mobility spectrometer can be made small

DETAILED DESCRIPTION

The invention proposes using a high-performance plastic, which is preferably easy to form by injection molding, for at least part of the insulating main body of the drift tube and the ion source. This enables very small and, particularly, light ion mobility spectrometers to be produced which are good for using in miniaturized instruments which are no larger than a cigarette packet.

The high-performance plastic polyphenylene sulfide (PPS) can be used as the preferred material for this purpose. This partially crystalline high-performance plastic has the outstanding property that it is mechanically stable up to approximately 270° Celsius, but can be processed very well by means of injection molding. Injection molding with this plastic allows the finest details of the casting mold to be reproduced. The plastic also exhibits low outgassing properties; even at 220° Celsius the mobility spectra have only a very low chemical background. It is highly resistant to aggressive solvents and also chemically resistant. It absorbs practically no water. The melting point is around 285° Celsius. PPS for injection molding initially became known under the name "Ryton" (Solvay Specialty Polymers). Other companies produce PPS under different names (Tecatron, Tedur, Ecotran, Fortron and others). In particular, it is also possible to use a fiber-reinforced PPS (for example, Techtron HPV).

Figure 2:
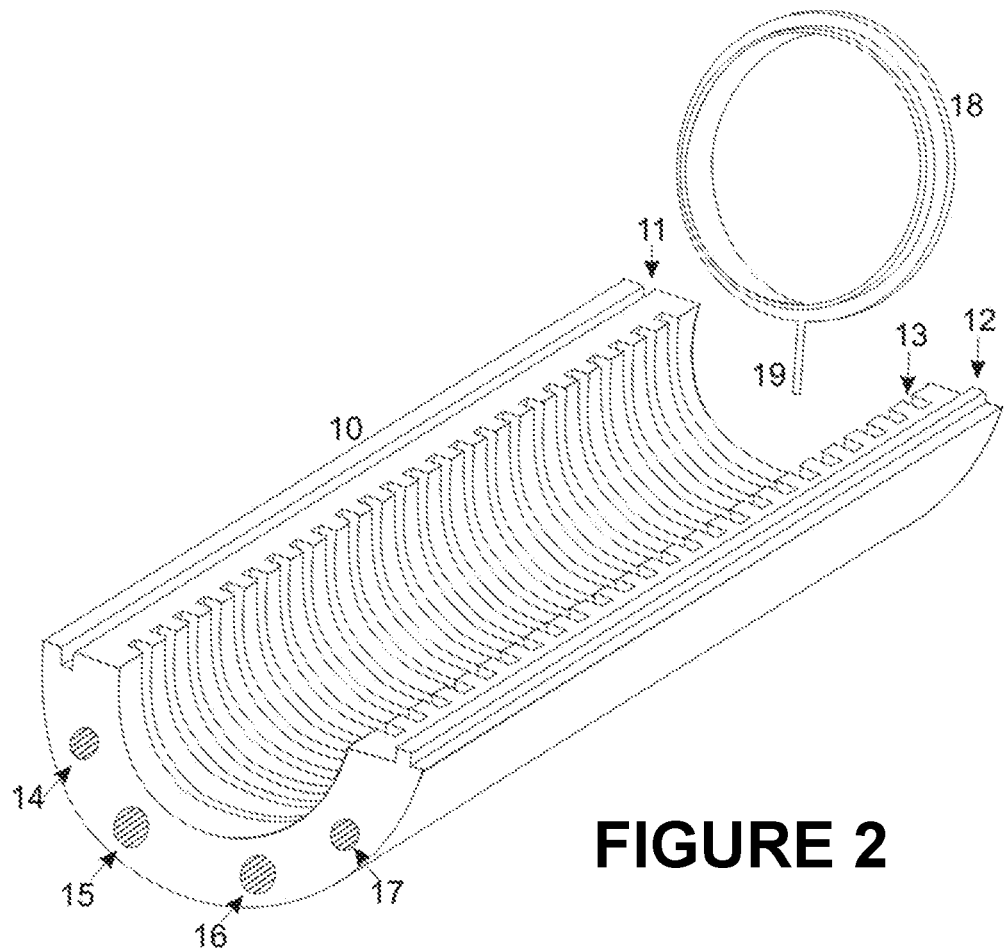
FIG. 2 shows an arc-shaped half-shell (10) made of polyphenylene sulfide (PPS) with a groove (11) and a tongue (12) to form a press-fit connection between two half-shells which are joined together to form the main body of a drift tube.

FIG. 2 shows an arc-shaped half-shell (10) which is manufactured from polyphenylene sulfide (PPS) by injection molding and has a groove (11) and a tongue (12) to form a press-fit connection between two half-shells. The ends of the half-shell (10) are left open for the insertion of an ion source and a detector. However, such a half-shell can also be manufactured so as to be closed at one or both ends and also have a tongue and groove there.

In this embodiment, the main body for the drift tube and the ion source region comprises two joined half-shells (10). To join the half-shells (10), groove (11) and tongue (12) can be dimensioned so that the half-shells (10) can be firmly joined to each other by means of a press-fit connection. Other ways of joining the two half-shells, such as bonding or plastic welding, are also possible, however.

On the inside of the half-shell (10) are semicircular grooves (13) into which electrode rings (18) with contact pins (19) are inserted. The contact pins (19) can be fed through holes or indentations in the tongue (not shown) to the outside. Further components of the drift tube such as gating grids or screening grids can each be inserted into one of the grooves (13).

The half-shell (10) has longitudinal channels (14), (15), (16) and (17), which serve to transport drift gas or accommodate heating elements. The longitudinal channels (14) and (17) accommodate heating elements, while the gas channels (15) and (16) serve to guide the drift gas. The gas channels (15) and (16) can be connected with the interior of the half-shell (10) by holes which are drilled afterwards or by channels formed during injection molding. If the inside diameter of the gas channels (15) and (16) is sufficiently large, it is possible to use a simple fan for the circulation of the drift gas in the gas circuit of the ion mobility spectrometer instead of a pump. In FIG. 2, the wall of the half-shell (10) is shown as being relatively thick in relation to the length and can be chosen so as to be significantly smaller in practice, while the gas channels can also lie in recesses of an otherwise thin wall, for example.

The inside diameter of the half-shell (10), and thus the main body of a drift tube based on it, is around 14 millimeters for currently common mobility spectrometers, and the total length is around 10 to 15 centimeters. The aim in the future is to miniaturize the device, with inside diameters of 6 to 10 millimeters, and lengths of around 10 centimeters. Since PPS has a density of only around 1.3 g/cm$^3$, the drift tube made of PPS is much lighter than drift tubes made out of ceramic.

In a further embodiment, a half-shell can be manufactured by injection molding without any internal grooves. Instead of inserting electrode rings (18), interior surfaces of the half-shell can be metalized and serve as electrodes. The metalized surfaces are supplied with DC potentials by means of conductive connections from the outside. This embodiment can have a much thinner wall because there are no grooves, and can therefore be lighter than the half-shell (10) in FIG. 2.

In a further embodiment, the electrode rings are applied on a round core at correct separations, and the core with the electrode rings is fully encapsulated by the injection molding material in an outer mold block. After removing the outer mold block and withdrawing the inner mold core, the structure of the drift tube is complete. This produces a full-mold unit which does not require any joining of half-shells. The electrode rings are equipped with connection pins which protrude from the main body and can be contacted appropriately. Here also, longitudinal channels can be provided to guide the gas and accommodate heating elements.

Figure 3:
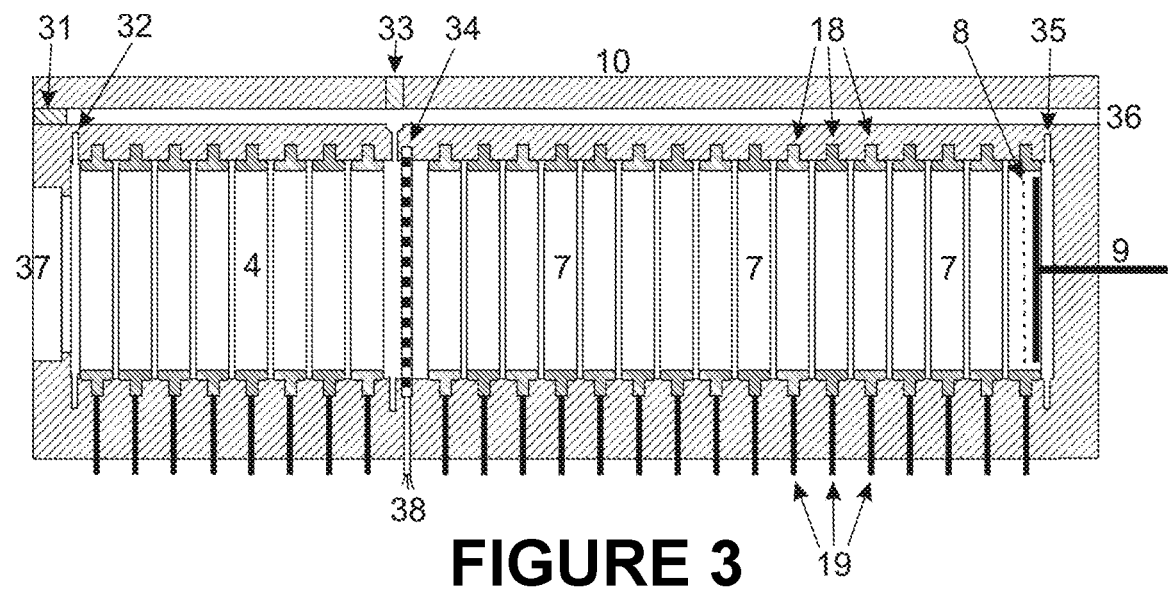
FIG. 3 shows a cross-section of a tube (10) comprising two half-shells made of polyphenylene sulfide (PPS) with metal electrodes inserted (18). The tube (10) comprises an ion source region (4) and a drift region (7) of the drift tube.

FIG. 3 illustrates a cross-section of a tube (10) whose main body comprises two half-shells made of polyphenylene sulfide (PPS).

The main body of the tube (10) comprises an ion source region (4) and a drift region (7). A gating grid (34) with connections (38) is located between the ion source region (4) and the drift region (7). The two half-shells have semicircular grooves into which the electrode rings (18) with contact pins (19) and the gating grid (34) are inserted. The contact pins (19) of the electrode rings (18) protrude to the outside, where they are supplied with DC potentials to generate an axial electric field in the ion source region (4)

and especially along the drift region (7). The two half-shells are closed at the rear end of the tube (10), and the terminating wall supports a screen grid (8) and a Faraday detector (9). The front end aperture (37) is intended for inserting an ion source equipped with a sample gas feed-in and a radioactive or non-radioactive electron emitter. The ion source can optionally have an inlet membrane. It is also possible to incorporate a desorber chamber, also made of PPS, in front of the ion source region, said desorber chamber having special heating elements for the vaporization of samples of explosives and drugs from swab strips at temperatures of up to 250° Celsius.

Figure 1:
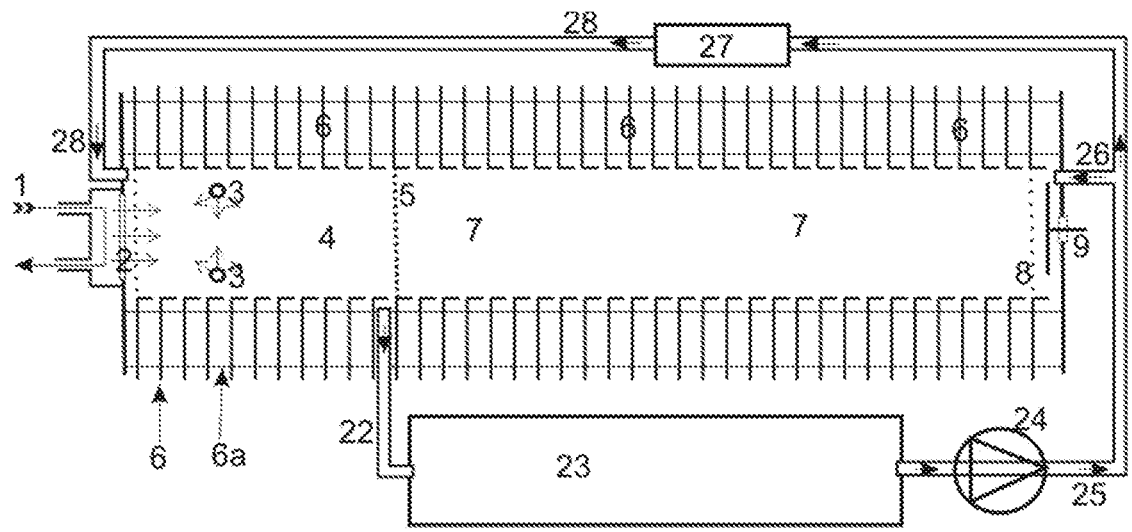
FIG. 1 is a schematic diagram of a conventional ion mobility spectrometer for the detection of explosives, chemical warfare agents, drugs or pollutants in air. The spectrometer essentially comprises a tube constructed from a series of ceramic rings (6a) and metal electrodes (6) which are firmly joined to each other. Electrical DC voltage potentials at the metal electrodes (6) generate an axial electric field in the whole tube.

The main body of the tube (10) has ring channels (32), (33) and (35). The ring channels (32) and (35) are provided to feed the drift gas into the ion source region (4) or into the drift region (7) respectively, and are connected with corresponding longitudinal channels in the main body of the tube (10). The ring channel (33) is connected with the longitudinal channel (36) by a hole and removes drift gas, which flows from the feeds (32, 35) to the gating grid (34), the hole being sealed on the outside by means of a plug. The longitudinal channel (36) is sealed at one end with a plug (31). It shall be briefly noted here that the wall can be kept much thinner than is schematically shown in FIG. 3 to reduce the weight. The gas channels (32, 33, 35, 36) here can have such a large diameter that the flow of the drift gas meets little resistance and the pump (24) used in FIG. 1 can be replaced by a miniaturized fan.

Further longitudinal channels can accommodate heating elements to produce a desired operating temperature. Shorter longitudinal channels in the ion source region can accommodate heating elements which keep the ion source at a higher temperature than the drift tube.

It is additionally advantageous if the contact pins (19) are bonded in, since then the electrode rings (18) remain positioned coaxially with respect to each other if the main body of the tube (10) expands more than the electrode rings (18) as a result of high temperatures.

Figure 4:
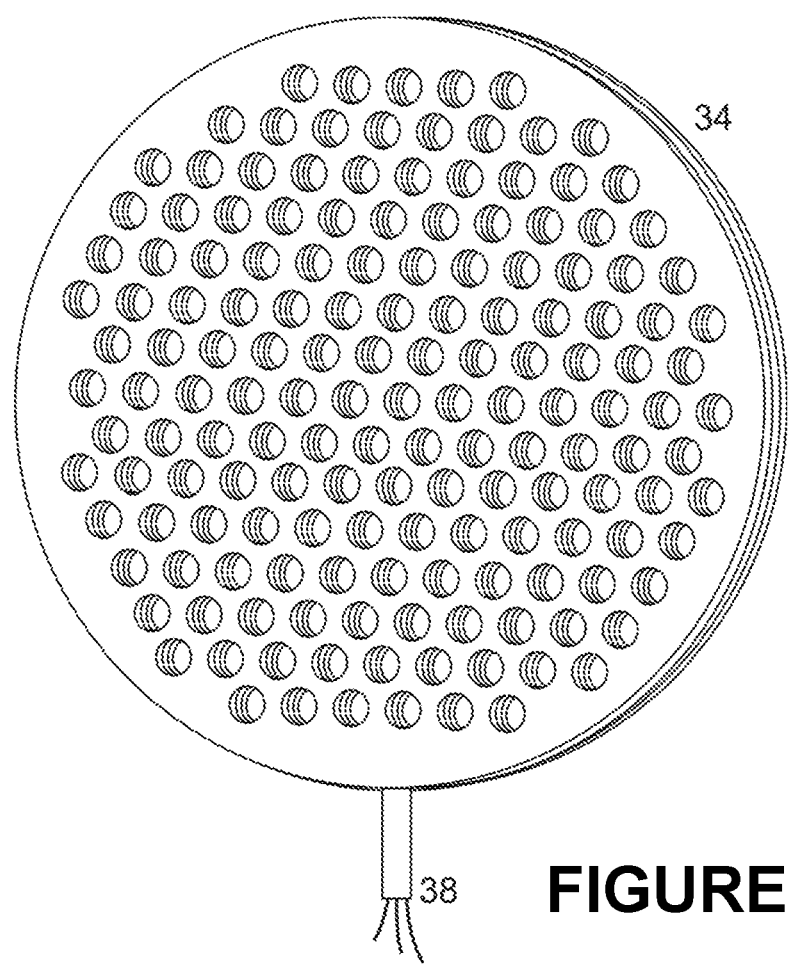
FIG. 4 shows a layered plate with apertures, which can serve as the gating element (34) for the ion current.

The gating grid (34) in FIG. 3 is designed as a layered plate with apertures, as is depicted schematically in FIG. 4. The apertured plate comprises at least three conductive and two insulating (or only weakly conductive) layers, which are arranged alternately. Potentials can be applied to the conductive layers ("electrode layers") by means of the multicore connection (38). An apertured plate can consist of the layers copper-Kapton-copper-Kapton-copper, for example. The layers are firmly bonded with each other. The apertured plate is particularly suitable for an analog modulation of the ion current, whose advantages are described in the above-referenced patent DE 10 2008 015 000 B4 (U. Renner).

The apertured plate as the gating grid (34) is very robust compared to wire grids with their many, often thin, individually deformable single strips, and is less susceptible to vibrations, since it is a compact unit. It can be miniaturized and precision-manufactured at low cost and in large numbers with techniques widely known from circuit board manufacture. Even though the maximum transmission corresponds only to around half that of a grid, the apertured plate has unbeatable advantages, particularly for acquiring mobility spectra on the basis of modulation methods. The apertured plate is additionally very favorable for miniaturization.

The invention claimed is:

1. An ion mobility spectrometer comprising a drift tube and an upstream ion source region, wherein at least one of the drift tube and the ion source region have a main body which is made at least in part of a polyaryl whose aromatic rings are linked via sulfur atoms or $SO_2$ groups, and
   wherein a desorber chamber upstream of the ion source region has a main body which comprises the polyaryl and which is connected to a main body of the ion source region or which forms a shared main body with a main body of the ion source region.

2. The ion mobility spectrometer according to claim 1, wherein the polyaryl is a polyphenylene sulfide (PPS).

3. The ion mobility spectrometer according to claim 1, wherein the polyaryl can be injection-molded.

4. The ion mobility spectrometer according to claim 1, wherein the main body comprises two joined half-shells with internal grooves and the drift tube has conductive electrodes which are inserted into the grooves.

5. The ion mobility spectrometer according to claim 4, wherein the conductive electrodes comprises metal rings.

6. The ion mobility spectrometer according to claim 4, wherein a gating element or a screening grid is inserted into one of the internal grooves in each half-shell.

7. The ion mobility spectrometer according to claim 1, wherein the main body comprises two joined half-shells, whose interior surfaces are coated with a pattern of conductive layers.

8. The ion mobility spectrometer according to claim 7, wherein said conductive layers are metal layers.

9. The ion mobility spectrometer according to claim 1, wherein the main body or a segment of it comprises a single plastic component which is injection molded around inner conductive electrodes to form a full-mold unit.

10. The ion mobility spectrometer according to claim 1, wherein a wall of the main body contains longitudinal channels to guide a gas and/or to accommodate heating elements.

11. A method for the manufacture of an ion mobility spectrometer, wherein at least one of a main body of a drift tube and a main body of an ion source region is formed by injection molding of a polyaryl, whose aromatic rings are linked sulfur atoms or $SO_2$ groups, and
    wherein a desorber chamber upstream of the ion source region has a main body which comprises the polyaryl and which is connected to a main body of the ion source region or which forms a shared main body with a main body of the ion source region.

12. The method according to claim 11, wherein the polyaryl is a polyphenylene sulfide.

13. The method according to claim 11, wherein the main body is injection molded around inner electrodes to form a full-mold unit.

14. A method for the operation of an ion mobility spectrometer comprising a drift tube and an ion source region, wherein at least one of the drift tube and the ion source region have a main body which is made at least in part of a polyaryl whose aromatic rings are linked via sulfur atoms or $SO_2$ groups, and at least one of the drift tube and the ion source region are operated at a temperature of between 100° Celsius and 220° Celsius.

15. The method according to claim 14, wherein the at least one of the drift tube and the ion source region are operated at a temperature of between 150° Celsius and 220° Celsius.

* * * * *